United States Patent
Marcoccia et al.

(10) Patent No.: US 10,447,422 B2
(45) Date of Patent: *Oct. 15, 2019

(54) METHODS AND APPARATUS FOR REMOTE MANAGEMENT OF AN OPTICAL TRANSCEIVER SYSTEM

(71) Applicant: Juniper Networks, Inc., Sunnyvale, CA (US)

(72) Inventors: Roberto Marcoccia, San Jose, CA (US); Theodore J. Schmidt, Gilroy, CA (US); George R. Sosnowski, Sunnyvale, CA (US); Christian Malouin, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,201

(22) Filed: Jul. 9, 2018

(65) Prior Publication Data
US 2018/0331779 A1    Nov. 15, 2018

Related U.S. Application Data

(63) Continuation of application No. 14/871,514, filed on Sep. 30, 2015, now Pat. No. 10,020,908.

(51) Int. Cl.
*H04J 14/02* (2006.01)
*G02B 6/293* (2006.01)
(Continued)

(52) U.S. Cl.
CPC ...... *H04J 14/0258* (2013.01); *G02B 6/29385* (2013.01); *H04B 10/0779* (2013.01);
(Continued)

(58) Field of Classification Search
CPC combination set(s) only.
See application file for complete search history.

(56) References Cited

U.S. PATENT DOCUMENTS 5,777,761 A    7/1998    Fee
6,101,012 A    8/2000    Danagher et al.
(Continued)

FOREIGN PATENT DOCUMENTS

CN    104734774 A    6/2015
EP    2437418        4/2012
(Continued)

OTHER PUBLICATIONS

First Office Action for Chinese Application No. 201610262807.1, dated Jun. 27, 2018, 9 pages.
(Continued)

*Primary Examiner* — Omar S Ismail
(74) *Attorney, Agent, or Firm* — Cooley LLP

(57) ABSTRACT

In some embodiments, an apparatus includes a first optical transceiver. The first optical transceiver includes a set of optical transmitters, an optical multiplexer operatively coupled to the set of optical transmitters, and a variable optical attenuator operatively coupled to the optical multiplexer. The variable optical attenuator is configured to receive a control signal from a controller of the first optical transceiver and modulate a signal representing control information with an output from the optical multiplexer. The control information is associated with the control signal and for a second optical transceiver operatively coupled to the first optical transceiver.

18 Claims, 4 Drawing Sheets

(51) Int. Cl.
*H04B 10/077* (2013.01)
*H04B 10/40* (2013.01)

(52) U.S. Cl.
CPC .............. *H04B 10/40* (2013.01); *H04J 14/02* (2013.01); *H04J 14/0256* (2013.01); *H04J 14/0272* (2013.01); *H04B 2210/074* (2013.01)

(56) References Cited

U.S. PATENT DOCUMENTS

| | | |
|---|---|---|
| 6,172,786 B1 | 1/2001 | Fujita et al. |
| 6,839,366 B1 | 1/2005 | Houle |
| 7,233,738 B2 | 6/2007 | Kerfoot, III |
| 7,426,346 B2 | 9/2008 | Wang et al. |
| 7,941,053 B2 | 5/2011 | Dallesasse |
| 8,041,210 B2 | 10/2011 | Aronson et al. |
| 8,693,864 B2 | 4/2014 | Kubo et al. |
| 9,118,411 B1 | 8/2015 | Schmidt et al. |
| 9,258,056 B2 | 2/2016 | Malouin et al. |
| 9,350,445 B1 | 5/2016 | Schmidt et al. |
| 9,882,633 B2 | 1/2018 | Schmidt et al. |
| 9,882,637 B2 | 1/2018 | Malouin et al. |
| 2005/0168806 A1 | 8/2005 | Maeda et al. |
| 2008/0095541 A1 | 4/2008 | Dallesasse |
| 2009/0116839 A1 | 5/2009 | Kikuchi et al. |
| 2010/0021166 A1* | 1/2010 | Way ........................ H04J 14/02 398/79 |
| 2010/0158530 A1 | 6/2010 | Soto et al. |
| 2010/0183294 A1* | 7/2010 | Villarruel ............. H04B 10/032 398/10 |
| 2011/0249936 A1 | 10/2011 | Welch et al. |
| 2012/0082168 A1 | 4/2012 | Sunaga et al. |
| 2012/0082458 A1 | 4/2012 | Bouda et al. |
| 2012/0170931 A1* | 7/2012 | Evans ................. H04J 14/0227 398/48 |
| 2012/0170938 A1* | 7/2012 | Evans .................. H04B 10/073 398/91 |
| 2013/0101298 A1 | 4/2013 | Jovanovich et al. |
| 2014/0029951 A1 | 1/2014 | Handelman |
| 2014/0079385 A1* | 3/2014 | Shukunami ........ H04B 10/0775 398/16 |
| 2014/0247840 A1* | 9/2014 | Eiselt ................. H04B 10/0779 370/535 |
| 2015/0050015 A1 | 2/2015 | Levy et al. |
| 2016/0301496 A1* | 10/2016 | Eiselt ................. H04J 14/0227 |

FOREIGN PATENT DOCUMENTS

| | | |
|---|---|---|
| EP | 2661004 | 11/2013 |
| EP | 3079284 A1 * | 10/2016 .......... H04J 14/0227 |
| WO | WO 2006/065573 | 6/2006 |

OTHER PUBLICATIONS

Extended European Search Report for European Application No. 16163428.2, dated Mar. 2, 2017, 7 pages.
Extended European Search Report for European Application No. 16163429.0, dated Feb. 23, 2017, 8 pages.
Office Action for U.S. Appl. No. 14/042,068, dated Dec. 10, 2014.
Office Action for U.S. Appl. No. 14/834,168, dated Oct. 6, 2015.
Office Action for U.S. Appl. No. 14/871,424, dated Nov. 2, 2016.

* cited by examiner

300

302 Receive a control signal from a controller of a first optical transceiver.

304 Modulate a signal representing control information to form an modulated signal.

306 Send to a second optical transceiver a signal having data information and the modulated signal representing the control information such that the second optical transceiver modifies its operation based on the modulated signal.

402 Receives, at an optical tap of a first optical transceiver, an optical signal from a second optical transceiver.

404 Detects, at an optical detector of the first optical transceiver, a portion of the optical signal to produce a detected signal.

406 Decodes, at a controller of the first optical transceiver, the detected signal to extract an encoded signal from the optical signal.

408 Makes a control decision, at the controller of the first optical transceiver, based on the encoded signal such that the first optical transceiver modifies its operation based on the encoded signal.

METHODS AND APPARATUS FOR REMOTE MANAGEMENT OF AN OPTICAL TRANSCEIVER SYSTEM

CROSS-REFERENCE TO RELATED PATENT APPLICATIONS

This application is a continuation of U.S. patent application Ser. No. 14/871,514, filed on Sep. 30, 2015, now U.S. Patent No. 10,020,908, and entitled "Methods and Apparatus for Remote Management of an Optical Transceiver System," the disclosure of which is incorporated herein by reference in its entirety.

BACKGROUND

Some embodiments described herein relate generally to methods and apparatus for remote management of an optical transceiver. In particular, but not by way of limitation, some embodiments described herein relate to methods and apparatus for remote management of an optical transceiver via an embedded communication channel (ECC).

Optical transceivers used in WDM systems transmit and receive data by combining a number of different optical channels or signals at different wavelengths onto a single optical fiber or a set of optical fibers. Each wavelength can be associated with a different WDM channel. Light for these WDM channels can be modulated to produce optical signals at different wavelengths to carry data separately.

In an optical network with a number of optical transceivers, each optical transceiver can have its status monitored and troubleshooting can be performed when an optical transceiver fails. Known methods typically provide information regarding the health of an optical transceiver locally. In other words, operational status of a given optical transceiver, such as loss of light, receiving optical power, and faults, are only available at such optical transceiver. Other known methods that use test equipment to examine the operational status of optical transceivers typically involve interrupting the connection to the optical transceivers to retrieve such information.

Accordingly, a need exists for methods and apparatus to remotely monitor and control an optical transceiver in an optical network without local interruption.

SUMMARY

In some embodiments, an apparatus includes a first optical transceiver. The first optical transceiver includes a set of optical transmitters, an optical multiplexer operatively coupled to the set of optical transmitters, and a variable optical attenuator operatively coupled to the optical multiplexer. The variable optical attenuator is configured to receive a control signal from a controller of the first optical transceiver and modulate a signal representing control information with an output from the optical multiplexer. The control information is associated with the control signal and for a second optical transceiver operatively coupled to the first optical transceiver.

BRIEF DESCRIPTION OF THE DRAWINGS

FIG. 3 is a flow chart illustrating a method of transmitting control information from an optical transceiver, according to an embodiment.

FIG. 4 is a flow chart illustrating a method of receiving control information at an optical transceiver, according to an embodiment.

DETAILED DESCRIPTION

In some embodiments, an apparatus includes a first optical transceiver. The first optical transceiver includes a set of optical transmitters, an optical multiplexer operatively coupled to the set of optical transmitters, and a variable optical attenuator operatively coupled to the optical multiplexer. The variable optical attenuator is configured to receive a control signal from a controller of the first optical transceiver and modulate a signal representing control information with an output from the optical multiplexer. The control information is associated with the control signal and for a second optical transceiver operatively coupled to the first optical transceiver.

In some embodiments, the apparatus further includes a set of optical receivers, an optical demultiplexer, an optical detector, and an optical tap. The optical demultiplexer is operatively coupled to the set of optical receivers. The optical tap is operatively coupled to the optical demultiplexer and the optical detector. The optical tap is configured to receive a portion of an optical signal received from the second optical transceiver. The optical detector is configured to detect the portion of the optical signal to produce a detected signal. The controller is configured to decode the detected signal to extract an encoded signal from the optical signal.

As used in this specification, the singular forms "a," "an" and "the" include plural referents unless the context clearly dictates otherwise. Thus, for example, the term "an optical transceiver" is intended to mean a single optical transceiver or multiple optical transceivers.

Figure 1:
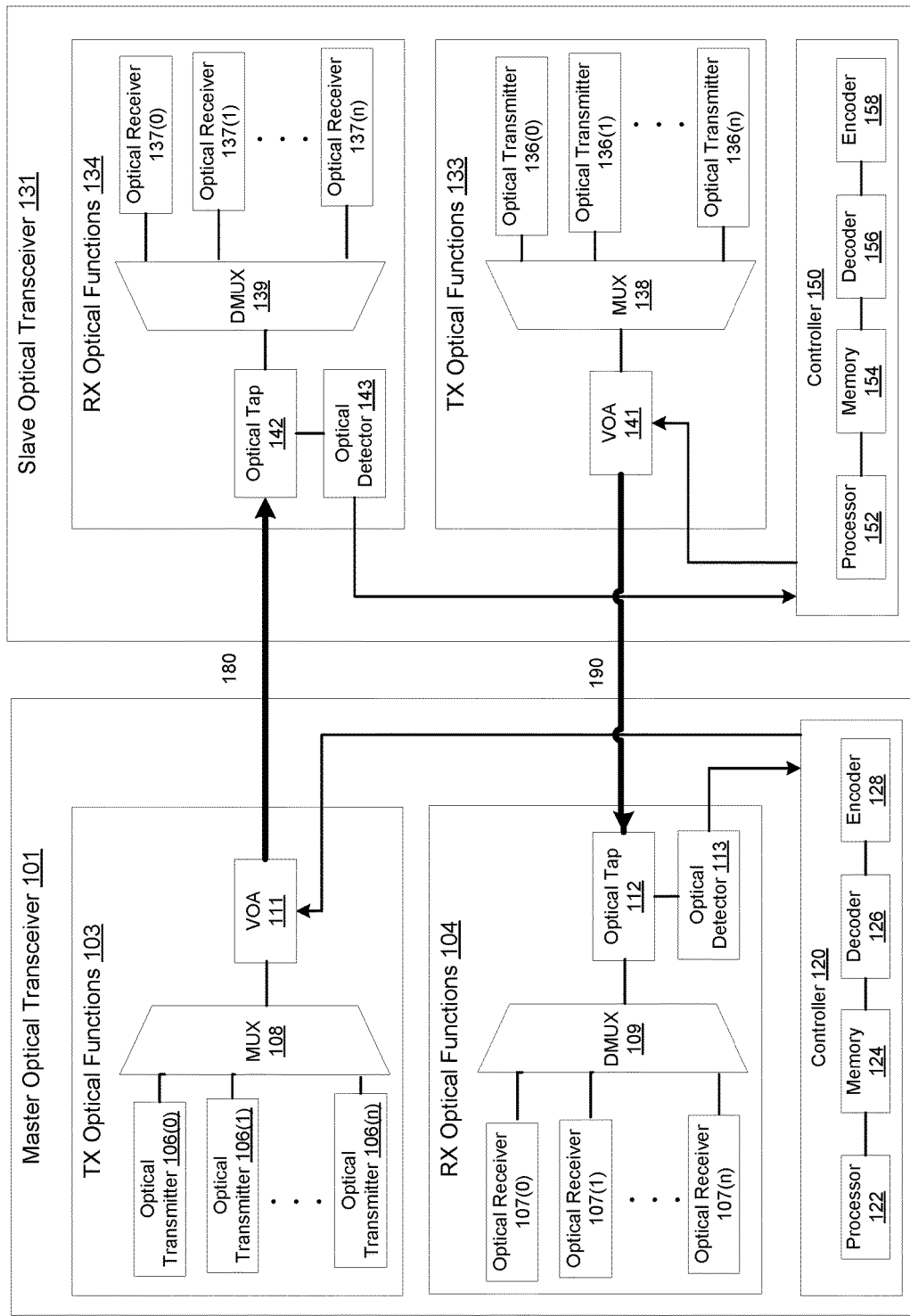
FIG. 1 is a block diagram of a master optical transceiver and a slave optical transceiver, according to an embodiment.

FIG. 1 is a block diagram of a master optical transceiver and a slave optical transceiver, according to an embodiment. The master optical transceiver 101 can be any high data rate optical transceiver such as, for example, an on-off-keyed (OOK) transmitter, an optical M-ary quadrature amplitude modulation (M-QAM) transmitter, an optical M-ary pulse amplitude modulation (mPAM) transmitter, a polarization multiplexed (PM) M-QAM transmitter, and/or the like. The master optical transceiver 101 includes transmit (Tx) electrical functions (not shown in FIG. 1), receive (Rx) electrical functions (not shown in FIG. 1), transmit (Tx) optical functions 103, receive (Rx) optical functions 104, and a controller 120. The Tx electrical functions are operatively coupled to the Tx optical functions 103. The Rx electrical functions are operatively coupled to the Rx optical functions 104. The Tx electrical functions, the Rx electrical functions, the Tx optical functions 103, and the Rx optical functions 104 are operatively coupled to the controller 120. Each of the Tx electrical functions, the Tx optical functions 103, and the controller 120 can send signals to and/or receive signals from each other. Similarly, each of the Rx electrical functions, the Rx optical functions 103, and the controller 120 can send signals to and/or receive signals from each other. Although the Tx electrical functions, the Tx optical functions 103, and the controller 120 are discussed in connection with FIG. 1 as being separate, each needs not be physically separate from the other two. Stated differently, the Tx electrical functions and/or the Tx optical functions 103 and/or the controller 120 may be co-located and/or integrated together within a single module, subsystem or component. Similarly, although the Rx electrical functions, the Rx optical functions 104, and the controller 120 are discussed in connection with in FIG. 1 as being separate, each needs not be physically separate from the other two. Stated differently, the Rx electrical functions and/or the Rx optical functions 104 and/or the controller 120 may be co-located and/or integrated together within a single module, subsystem or component.

The slave optical transceiver 131 is substantially the same in physical structures and functionality as the master optical transceiver 101. The slave optical transceiver 131 can be any high data rate optical transceiver such as, for example, an on-off-keyed (OOK) transmitter, an optical M-ary quadrature amplitude modulation (M-QAM) transmitter, an optical M-ary pulse amplitude modulation (mPAM) transmitter, a polarization multiplexed (PM) M-QAM transmitter, and/or the like. The slave optical transceiver 131 includes transmit (Tx) electrical functions (not shown in FIG. 1), receive (Rx) electrical functions (not shown in FIG. 1), transmit (Tx) optical functions 133, receive (Rx) optical functions 134, and a controller 150.

The Tx electrical functions of the master optical transceiver 101 generate and/or process electrical signals sent to the Tx optical functions 103 of the master optical transceiver 101. The Tx electrical functions are the electronic components of the master optical transceiver 101. For example, the Tx electrical functions can include a set of electrical transmitters that transmit a set of electrical signals from a set of electrical channels. The set of electrical signals are transmitted to the optical functions 103 and converted to optical signals. An example of the Tx electrical functions is discussed in U.S. Pat. No. 9,882,633, issued on Jan. 30, 2018, and entitled "Methods and Apparatus for Self Healing of an Optical Transceiver in a Wavelength Division Multiplexing (WDM) System," the contents of which are incorporated herein by reference in its entirety.

The Tx optical functions 103 are the photonic components of the master optical transceiver 101. For example, the Tx optical functions 103 may include a set of optical transmitters 106(0)-106(n), and an optical multiplexer (MUX) 108 operatively coupled to the set of optical transmitters 106(0)-106(n), and a variable optical attenuator 111 operatively coupled to the optical multiplexer.

Each optical transmitter 106(0)-106(n) from the set of optical transmitters in the Tx optical functions 103 can transmit at a unique wavelength from a set of wavelengths. Similarly, each optical receiver from the set of optical receivers 107(0)-107(n) in the master optical transceiver 101 can receive at a unique wavelength from a set of wavelengths.

The optical multiplexer 108 is a hardware device that can, for example, multiplex and route different channels of light or optical signals into or out of, for example, a single mode fiber (SMF). The optical multiplexer 108 can multiplex the optical signals generated and/or transmitted by the different optical transmitters from the set of optical transmitters 106(0)-106(n) onto a single optical fiber (or multiple optical fibers) 180 and send the different channels of optical signals to the variable optical attenuator (VOA) 111. When multiplexed onto multiple optical fibers, two or more optical signals can be multiplexed by the optical multiplexer 108 onto each of the multiple optical fibers.

The variable optical attenuator (VOA) 111 includes, for example, a Mach-Zehnder Modulator (MZM), a microelectromechanical system (MEMS), or other technology that varies an optical signal amplitude as a function of an applied electrical signal. The VOA 111 modulates the optical signal from each optical channel received from the MUX 108 such that the amplitude of the optical signal from each optical channel is varied based on an electrical signal input. The VOA 111 can send the optical signals to a single mode fiber 180 (or multiple optical fibers). The different channels of optical signals can be sent to the slave optical transceiver 131 via such single mode fiber.

Referring to the embodiment of the master optical transceiver 101 shown in FIG. 1, the master optical transceiver 101 further includes Rx optical functions 104. As discussed in detail herein, the Tx optical functions 103 can receive optical signals from the Tx electrical functions (not shown in FIG. 1) and send optical signals to the slave optical transceiver 131. The Rx optical functions can receive optical signals from the slave optical transceiver 131 and send optical signals to the Rx electrical functions (not shown in FIG. 1). Additionally, the optical functions 103/104 can also send signals to and/or receive signals from the controller 120.

The Rx optical functions 104 include the photonic components of the master optical transceiver 101. The Rx optical functions 104 may include a set of optical receivers 107(0)-107(n), and an optical demultiplexer (DMUX) 109 operatively coupled to the set of optical receivers 107(0)-107(n). The Rx optical functions 104 also include an optical tap 112 and an optical detector 113. Each optical receiver from the set of optical receivers 107(0)-107(n) in the Rx optical functions 104 can receive at a unique wavelength from a set of wavelengths.

The optical demultiplexer 109 is a hardware device that can, for example, demultiplex and route different channels of light or optical signals received from, for example, a single mode fiber (SMF). The optical demultiplexer 109 can demultiplex the optical signals received from a single optical fiber 190 (or multiple optical fibers) (or the optical tap 112), and can transmit to different optical receivers from the set of optical receivers 107(0)-107(n).

The optical tap 112 is a hardware device that can, for example, divert a portion of the one or more of the optical signals received from the optical fiber 190 to the optical detector 113. The optical detector 113 can detect the received portion(s) of the optical signal(s) from the optical tap 112. The optical detector 113 can include, for example, a monitor photodiode (MPD). The optical signal from the MPD can be further filtered by a low pass filter (LPF) (not shown in FIG. 1), amplified by an amplifier, (not shown in FIG. 1) and sent to the controller 120.

The controller 120 sends and/or receives control signals including control information to other components in the master optical transceiver 101. Although FIG. 1 shows the controller 120 to be separate from the Tx optical functions 103 and the Rx optical functions 104, the controller 120 may be physically co-located with the electrical functions (not shown in FIG. 1), the Tx optical functions 103, and/or the Rx optical functions 104. For example, in some configurations, the controller 120 may be physically disposed within an integrated circuit package co-packaged with the set of electrical transmitters, the set of electrical receivers, switches (not shown in FIG. 1), the set of optical transmitters 106, the set of optical receivers 107, the optical multiplexer 108 and/or the optical demultiplexer 109.

In some embodiments, the controller 120 includes a processor 122, a memory 124, a decoder 126 and an encoder 128. The memory 124 can be, for example, a random-access memory (RAM) (e.g., a dynamic RAM, a static RAM), a flash memory, a removable memory, a database and/or so forth. In some implementations, the memory 124 can include or implement, for example, a database, process, application, and/or some other software modules (stored in memory 124 and/or executing in processor 122) or hardware modules configured to execute remote management and control process and/or one or more associated methods for the remote management and control of the optical transceiver 101. In such embodiments, instructions for executing the remote management and control of optical transceivers process and/or the associated methods can be stored within the memory 124 and executed at the processor 122.

The processor 122 can include, for example, a field-programmable gate array (FPGA), an application specific integrated circuit (ASIC), a digital signal processor (DSP), and/or the like. The processor 122 can be configured to, for example, write data into and read data from the memory 124, and execute the instructions stored within the memory 124. The processor 122 can also be configured to execute and/or control, for example, the operations of the optical transmitters 106(0)-106(n), switches (not shown in FIG. 1), the set of optical receivers 107(0)-107(n), the variable optical attenuator (VOA) 111, the optical tap 112, and/or the optical detector 113. In some implementations, based on the methods or processes stored within the memory 124, the processor 122 can be configured to execute the remote management and control of optical transceivers process, as described in FIGS. 3-4.

The encoder 128 and the decoder 126 are modules operatively coupled to each other and to the remaining component(s) (e.g., processor 122, memory 124) of the controller 120. The encoder 128 and the decoder 126 can be any combination of hardware and/or software (stored and/or executing in hardware) capable of performing one or more specific functions associated with that module. In some embodiments, the encoder 128 and the decoder 126 can include, for example, a field-programmable gate array (FPGA), an application specific integrated circuit (ASIC), a digital signal processor (DSP), and/or the like.

During transmission of optical signals, the encoder 128 applies a low frequency (e.g., 100 kHz) electrical signal to the VOA 111 to modulate the amplitude of the optical signals. The applied low frequency electrical signal carries control information. The control information can include, for example, an identifier (or an address) of a slave optical transceiver 131 (or identifiers/addresses of multiple slave optical transceivers); an instruction to monitor, control, identify, or configure the slave optical transceiver 131 (or multiple slave optical transceivers); activate or deactivate an optical channel from the slave optical transceiver 131; update a software program of the slave optical transceiver 131; monitor optical signals received at the slave optical transceiver 131; and/or the like. Such control information can be contained in the magnitude, phase, or both of the low frequency electrical signal. The frequency of the electrical signal carrying the control information is lower than the frequencies of the optical signals (containing the data information) such that the information carried by (or modulated onto) the optical signals are not affected by the low frequency electrical signal. The low frequency electrical signal can be applied to one or multiple optical signals.

During receiving of the optical signals, the optical Rx signals are tapped by the optical tap 112 and a portion of the optical Rx signals are detected in the optical detector 113. The optical detector 113 can send the optical signals to the decoder 126. The decoder 126 extracts the embedded control information and the controller 120 analyzes the control information to manage, control, or configure the master optical transceiver 101. Similar to the control information transmitted from the master optical transceiver 101 to the slave optical transceiver 131, the control information received at the master optical transceiver 101 from the slave optical transceiver 131 can include, for example, an identifier (or an address) of a master optical transceiver (or identifiers/addresses of multiple master optical transceivers); an instruction to monitor, control, identify, or configure the master optical transceiver 101 (or multiple master optical transceivers); activate or deactivate an optical channel from the master optical transceiver 101; update a software program of the master optical transceiver 101; monitor optical signals received at the master optical transceiver 101; and/or the like. The control information analysis can be implemented by a processor and/or a memory of the controller 120 (e.g., processor 122 and/or memory 124).

As discussed above, the slave optical transceiver 131 is substantially the same in physical structures and functionality as the master optical transceiver 101. The slave optical transceiver 131 is communicatively coupled to the master optical transceiver 101. In one implementation, the slave optical transceiver 131 can be disposed in the same optical network as the master optical transceiver 101. In another implementation, the slave optical transceiver 131 can also be disposed in a different optical network as the master optical transceiver 101. The slave optical transceiver 131 includes a receive (Rx) optical functions 134, a transmit (Tx) optical functions 133, and a controller 150. The Rx optical functions 134 are substantially the same in physical structures and functionality as the Rx optical functions 104 of the master optical transceiver 101. The Tx optical functions 133 are substantially the same in physical structures and functionality as the Tx optical functions 103 of the master optical transceiver 101. The controller 150 is substantially the same in physical structures and functionality as the controller 120 of the master optical transceiver 101.

In use, the optical signals from each optical transmitter from the set of optical transmitters 106(0)-106(n) are multiplexed by the multiplexer 108 and transmitted to the VOA 111. The encoder 128 of the master optical transceiver 101 sends a low frequency electrical signal carrying control information to the VOA 111. The VOA 111 modulates the optical signals based on the low frequency electrical signal and produces modulated optical signals carrying data information and control information. The modulated optical signals are transmitted via the optical fiber 180 to the optical tap 142 of the slave optical transceiver 131. The modulated optical signals then tapped by the optical tap 142 of the slave optical transceiver 131 and a portion of the modulated optical signals are detected in the optical detector 143. The optical detector 143 can send the modulated optical signals to the decoder 156 of the slave optical transceiver 131. The decoder 156 extracts the embedded control information and the controller 150 analyzes the control information to manage, control, or configure the slave optical transceiver 131.

Similarly, the Tx optical functions 133 of the slave optical transceiver 131 can transmit optical signals to the Rx optical functions 104 of the master optical transceiver 101. The encoder 158 of the slave optical transceiver 131 sends a low frequency electrical signal carrying control information to the VOA 141. The VOA 141 modulates the optical signals based on the low frequency electrical signal and produces modulated optical signals carrying data information and control information. The modulated optical signals are transmitted via the optical fiber 190 to the optical tap 112 of the master optical transceiver 101. The modulated optical signals then tapped by the optical tap 112 of the master optical transceiver 101 and a portion of the modulated optical signals are detected in the optical detector 113. The optical detector 113 can send the modulated optical signals to the decoder 126 of the master optical transceiver 101. The decoder 126 extracts the embedded control information and the controller 120 analyzes the control information to manage, control, or configure the master optical transceiver 101.

For example, when the controller 120 of the master optical transceiver 101 detects a failure associated with an optical transmitter at the master optical transceiver 101, the encoder 128 sends a low frequency electrical signal carrying such failure message and/or corresponding control information to the VOA 111 of the master optical transceiver 101. The VOA 111 modulates optical signals based on the low frequency electrical signal and produces modulated optical signals carrying data information and control information. The modulated optical signals are transmitted to the slave optical transceiver 131. The decoder 156 of the slave optical transceiver 131 extracts a portion(s) of the embedded control information and the controller 150 analyzes the control information. The controller 150 sends a signal to activate a spare optical receiver at the slave optical transceiver 131 based on the control information such that the optical signal(s) transmitted from the failed optical transmitter at the master optical transceiver 101 can be received at the spare optical receiver at the slave optical transceiver 131. Details of such implementation are discussed in co-pending U.S. Pat. No. 9,882,633, issued on Jan. 30, 2018, and entitled "Methods and Apparatus for Self Healing of an Optical Transceiver in a Wavelength Division Multiplexing (WDM) System," the contents of which are incorporated herein by reference in its entirety.

For another example, the controller 120 of the master optical transceiver 101 can request status information of the slave optical transceiver 131 from the controller 150 of the slave optical transceiver 131. A control signal containing the request for the status information can be transmitted via modulated optical signals to the slave optical transceiver 131 and such status information can be returned via modulated optical signals to the controller 120 of the master optical transceiver 101.

In one configuration, the control information can be encoded onto multiple optical channels simultaneously at a transmit side of an optical transceiver. The control information can then be decoded from multiple optical channels at a receive side of another optical transceiver. In another configuration, the control information is encoded to a single optical channel at a transmit side of an optical transceiver before the optical signals from the set of optical transmitters are multiplexed at a multiplexer. The control information can then be decoded from a single optical channel at a receive side of another optical transceiver.

In some embodiments, the control signal can be initiated by the controller of the master optical transceiver via a synchronous serial interface such as SPI/MDIO/I2C or asynchronous serial interface via a universal asynchronous receiver/transmitter (UART). The local synchronous/asynchronous interface can be located at the controller.

In one embodiment, each optical transmitter from the set of optical transmitters is configured to send an optical signal having data information associated with a channel from a set of channels. The set of channels is, for example, a set of parallel signal mode (PSM) channels. Each optical transmitter is uniquely associated with a PSM channel from the set of PSM channels. In such embodiment, the VOA 111 is located between the set of optical transmitters and an optical splitter that splits the laser power to a set of optical modulators. The control information is encoded on one or more PSM channels. In such embodiment, the optical transceiver may not need an optical multiplexer.

In one embodiment, the optical signals transmitted/received from the set of optical transmitters/receivers can be directly modulated internally by the set of optical transmitters/receivers. In another embodiment, the optical signals transmitted/received from the set of optical transmitters/receivers can be externally modulated by a set of optical modulators.

Figure 2:
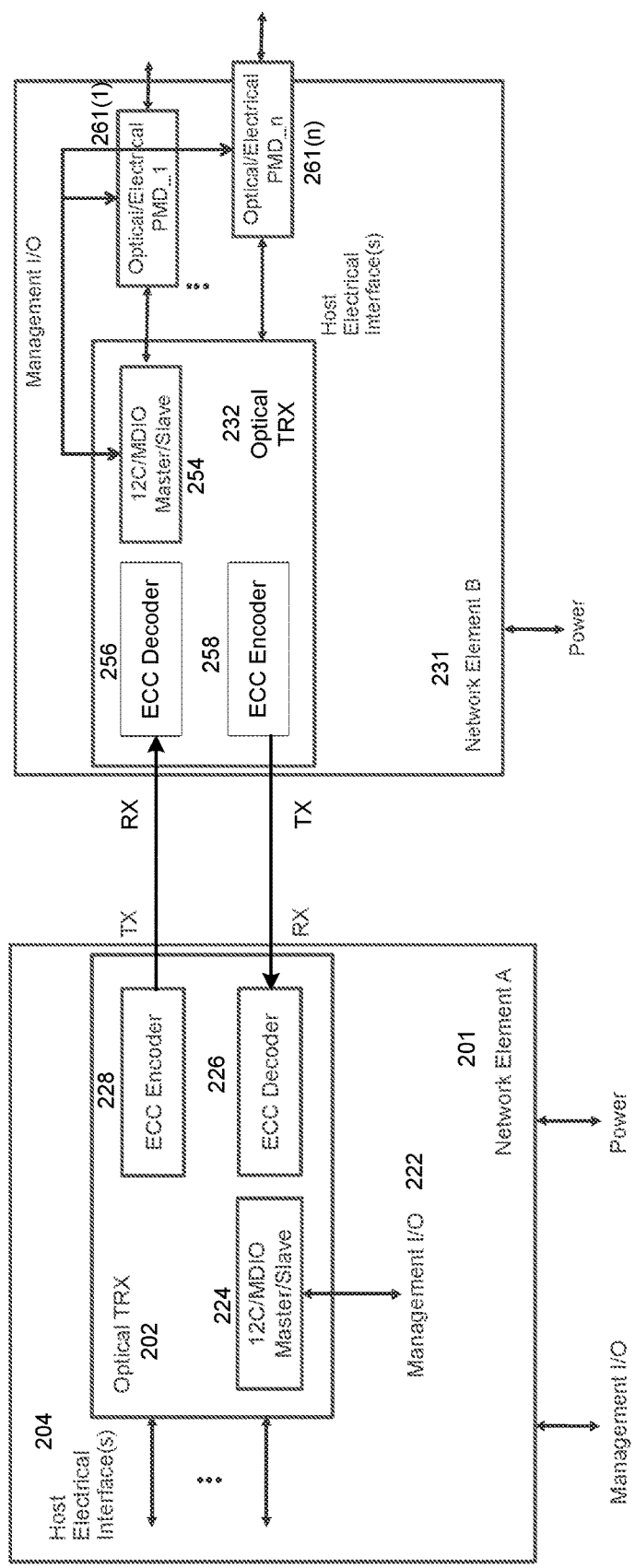
FIG. 2 is a block diagram of a controller in a master optical transceiver and a controller in a slave optical transceiver, according to an embodiment.

FIG. 2 is a block diagram of a controller in a master optical transceiver and a controller in a slave optical transceiver, according to an embodiment. In monitoring the operational health and the connectivity of an optical transceiver network including multiple optical transceivers, remote configuration and management of each optical transceiver without the requirement of local management is beneficial. A virtual bridge (i.e., a communication channel) between a host optical transceiver (also referred herein to as a master optical transceiver) and a remote optical transceiver (also referred herein to as a slave optical transceiver) can be configured to facilitate such remote management and configuration. A communication channel can be out of band (e.g., over the interne, over separate connections, or over a separate network), in band (e.g., using reserved bits in data framing of at least one of the optical channels), or via an embedded communication channel (ECC). The ECC information can be transmitted via the same fiber as the data information and is independent of the data information. To limit the amount of traffic flow across the ECC, a master optical transceiver can be configured to retrieve, for example, up to 64 bytes of status from a slave optical transceiver. In one implementation, the ECC is implemented as a point-to-point connection at, for example, 10 kbps.

As shown in FIG. 2, a network element A 201 (also referred herein to as a master network element) includes an optical transceiver 202. The optical transceiver 202 is operatively coupled to a host electrical interface(s) 204. The optical transceiver 202 includes an embedded communication channel (ECC) encoder 228, an ECC decoder 226, and a 12C/MDIO master/slave module 224. The 12C/MDIO master/slave module 224 receives management/control information via a management input/output (I/O) interface 222. A network element B 231 (also referred herein to as a slave network element), which is communicatively coupled to the network element A 201, includes an optical transceiver 232. The optical transceiver 232 is substantially similar in physical structures and functionality to the optical transceiver 202. The 12C/MDIO master/slave module 254 of the optical transceiver 232 transmits/receives management/control information via a management I/O interface (not shown in FIG. 2) to/from a set of optical/electrical physical medium dependent sublayer (PMD) devices 261(1)-261(n). The specifications for PMD include, for example, 10 gigabit Ethernet, fast Ethernet, gigabit Ethernet, and/or the like. A specification of 10GBASE-E can be used for single mode fiber operations, which operates in the 1550 nm band allowing for distances of up to 40 km to be reached. In such embodiment, the control information encoded by the optical transceiver 202 of the master network element A 201 is transmitted to the slave network element B 231. The optical transceiver 232 of the slave network element 231 decodes the control information and conveys to other devices (such as the PMDs 261(1)-261(n)) at the slave network element B 231. Control information can also be transmitted from the PMDs 261(1)-261(n), through the optical transceiver 232 of the slave network element B 231, to the optical transceiver 202 of the master network element A 201, thereby closing the communication link for the control information.

For example, a master optical transceiver can communicate with a set of Quad Small Form-factor Pluggable (QSFP) modules connected to a slave optical transceiver. The master optical transceiver has one slave 12C interface and two master 12C interfaces in addition to 32 general purpose input/outputs (GPIOs) that are configured to control and communicate status with a slave optical transceiver (or multiple slave optical transceivers). The slave 12C interface is used for the host to communicate to the master optical transceiver. One of the master 12C interfaces is shared to communicate to all of the QSFPs. 12 of the GPIOs are configured to act as ModSelL. Another 32 GPIOs are configured to receive indication of the module needing attention via the IntL lines. For the more static indications/control such as ModPrsL and Reset, the second master 12C is connected to an 12C port expander.

FIG. 3 is a flowchart illustrating a method of transmitting control information from an optical transceiver, according to an embodiment. This method 300 can be implemented at a processor and/or a memory (e.g., processor 122 or memory 124 as discussed in FIG. 1) of a controller of an optical transceiver (also referred herein to as a master optical transceiver). The method includes receiving a control signal from a controller of a first optical transceiver. As discussed above, a variable optical attenuator (VOA) of the first optical transceiver receives a low frequency (e.g., 100 kHz) electrical signal at 302 to modulate amplitudes of optical signals being transmitted within and by the first optical transceiver at 304. The low frequency electrical signal represents, for example, control information including an identifier of a slave optical transceivers (or identifiers of multiple slave optical transceivers); an instruction to monitor, control, or configure a slave optical transceiver (or multiple slave optical transceivers); activate or deactivate an optical channel (or multiple optical channels) from the slave optical transceiver; update a software program of the slave optical transceiver; monitor optical signals received at the slave optical transceiver; and/or the like. Such control information can be contained in the magnitude, phase, or both of the low frequency electrical signal. The frequency of the electrical signal carrying the control information is lower than the frequencies of the optical signals (containing the data information) such that the transmission of the optical signals are not affected by the low frequency electrical signal.

At 304, the VOA forms a modulated signal based on the received control signal (i.e., the low frequency electrical signal). At 306, the master optical transceiver sends to a second optical transceiver (also referred herein to as a slave optical transceiver) a signal having data information and the modulated signal representing the control information. A decoder (such as the decoder 156 discussed in FIG. 1) at the second optical transceiver decodes the modulated signal and extracts the control information transmitted from the first optical transceiver. A controller of the second optical transceiver sends commands to other components of the second optical transceiver to modify its operation based on the modulated signal.

FIG. 4 is a flowchart illustrating a method of receiving control information at an optical transceiver, according to an embodiment. This method 400 can be implemented at a processor and/or a memory (e.g., processor 152 or memory 154 as discussed in FIG. 1) of a controller of an optical transceiver. The method includes, at 402, receiving at an optical tap of a first optical transceiver (also referred herein to as a slave optical transceiver) an optical signal from a second optical transceiver (also referred herein to as a master optical transceiver).

At 404, the slave optical transceiver detects, at an optical detector, a portion of the optical signal to produce a detected signal. The optical Rx signals are tapped by the optical tap and a portion of the optical Rx signals are detected in the optical detector. The optical detector can send the optical signals to a decoder of the slave optical transceiver.

At 406, a decoder of the first optical transceiver decodes the detected signal to extract an encoded signal from the optical signal. The decoder extracts the embedded control information and the controller analyzes the control information to manage, control, or configure the master optical transceiver. Similar to the control information transmitted from the master optical transceiver to the slave optical transceiver, the control information received at the master optical transceiver from the slave optical transceiver can include an instruction to monitor, control, or configure the master optical transceiver (or multiple master optical transceivers), activate or deactivate an optical channel from the master optical transceiver, update a software program of the master optical transceiver, monitor optical signals received at the master optical transceiver 101 and/or the like.

At 408, the controller of the slave optical transceiver makes a control decision based on the encoded signal such that the slave optical transceiver modifies its operation based on the encoded signal.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools.

Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
   generating, at a controller of a first optical transceiver, a control signal having control information;
   modulating an optical signal output from an optical transmitter of the first optical transceiver with an electrical signal having the control information to produce a plurality of modulated optical signals, the control information including a plurality of control information portions, each control information portion from the plurality of control information portions being associated with an optical transceiver from a plurality of optical transceivers operatively coupled to the first optical transceiver and not associated with at least one optical transceiver from the plurality of optical transceivers, the plurality of optical transceivers including a second optical transceiver;
   sending, from the first optical transceiver, the plurality of modulated optical signals to the second optical transceiver causing the second optical transceiver to configure the second optical transceiver based on the control information.

2. The method of claim 1, wherein:
   the plurality of modulated optical signals is a first plurality of modulated optical signals,
   the control signal is a first control signal,
   the control information is first control information,
   the method further includes:
      receiving a second plurality of modulated optical signals from a third optical transceiver; and
      decoding at least one modulated optical signal from the second plurality of modulated optical signals to produce a second signal representing second control information associated with an operational status of the third optical transceiver.

3. The method of claim 1, wherein a frequency of the optical signal is higher than a frequency of the electrical signal.

4. The method of claim 1, wherein the control information is represented as at least one of an amplitude of the electrical signal or a phase of the electrical signal.

5. The method of claim 1, wherein:
   the first optical transceiver includes a plurality of optical transmitters including the optical transmitter, and
   the modulating includes modulating an optical signal output from each optical transmitter of the plurality of optical transmitters before the optical signal output from that optical transmitter is multiplexed by an optical multiplexer.

6. The method of claim 1, wherein:
   the first optical transceiver includes a plurality of optical transmitters including the optical transmitter, and
   the modulating includes modulating an optical signal output from each optical transmitter of the plurality of optical transmitters after the optical signal output from that optical transmitter is multiplexed by an optical multiplexer.

7. The method of claim 1, wherein:
   the first optical transceiver includes a plurality of optical transmitters including the optical transmitter,
   each optical transmitter from the plurality of optical transmitters is uniquely associated with a wavelength division multiplex (WDM) channel from a plurality of WDM channels.

8. The method of claim 1, wherein:
   the first optical transceiver includes a plurality of optical transmitters including the optical transmitter,
   each optical transmitter from the plurality of optical transmitters is uniquely associated with a parallel signal mode (PSM) channel from a plurality of PSM channels.

9. The method of claim 1, wherein the control information includes (1) a failure message associated with the optical transmitter of the first optical transceiver, (2) an instruction to configure the second optical transceiver, (3) an instruction to activate or deactivate an optical receiver of the second optical transceiver, (4) an instruction to monitor optical signals received at the second optical transceiver, (5) a request for status information of the second optical transceiver, or (6) an identifier of the second optical transceiver.

10. An apparatus, comprising:
    a processor configured to generate a control signal having control information to control a remote optical transceiver, the control information including a plurality of control information portions, each control information portion from the plurality of control information portions being associated with a remote optical transceiver from a plurality of remote optical transceivers operatively coupled to a variable optical attenuator (VOA) and not associated with at least one remote optical transceiver from the plurality of remote optical transceivers, and
    an optical transmitter operatively coupled to the processor, the optical transmitter configured to transmit an optical signal,
    the VOA operatively coupled to the processor and the optical transmitter,
       the VOA configured to receive the control signal from the processor,
       the VOA configured to modulate the optical signal with the control signal to produce a modulated optical signal,
       the VOA configured to send the modulated optical signal to the remote optical transceiver causing the remote optical transceiver to control the remote optical transceiver based on the control information.

11. The apparatus of claim 10, further comprising:
    a plurality of optical transmitters including the optical transmitter, each optical transmitter from the plurality of optical transmitters configured to transmit an optical signal associated with that optical transmitter and from a plurality of optical signals, each optical signal from the plurality of optical signals being multiplexed to collectively produce a multiplexed optical signal,
    the VOA configured to modulate the multiplexed optical signal with the control information to produce a modulated multiplexed optical signal,
    the VOA configured to send the modulated multiplexed optical signal to the remote optical transceiver causing the remote optical transceiver to control the remote optical transceiver based on the control information.

12. The apparatus of claim 10, wherein:
the VOA is configured to send the modulated optical signal to the plurality of remote optical transceivers causing each remote optical transceiver from the plurality of remote optical transceivers to control that remote optical transceiver based on the control information.

13. The apparatus of claim 10, wherein:
the modulated optical signal is a first modulated optical signal,
the control signal is a first control signal,
the control information is first control information,
the remote optical transceiver is a first remote optical transceiver,
the apparatus further includes an optical tap configured to receive a portion of a second modulated optical signal from a second remote optical transceiver,
the processor is configured to decode the portion of the second modulated optical signal to receive second control information associated with the second remote optical transceiver.

14. The apparatus of claim 10, wherein the control information is represented as at least one of an amplitude of the control signal or a phase of the control signal.

15. The apparatus of claim 10, wherein the VOA is configured to modulate the optical signal with the control signal before the optical signal is multiplexed by an optical multiplexer.

16. The apparatus of claim 10, further comprising:
a plurality of optical transmitters, each optical transmitter from the plurality of optical transmitters is uniquely associated with a wavelength division multiplex (WDM) channel from a plurality of WDM channels.

17. A method, comprising:
receiving, at a first optical transceiver, an encoded optical signal from a second optical transceiver, the encoded optical signal including an optical signal encoded with a control signal having control information generated by the second optical transceiver, the first optical transceiver being remote from the second optical transceiver and configured to be operatively coupled to the second optical transceiver by an optical connection, the control information including a plurality of control information portions, each control information portion from the plurality of control information portions being associated with an optical transceiver from a plurality of optical transceivers operatively coupled to the second optical transceiver and not associated with at least one optical transceiver from the plurality of optical transceivers, the plurality of optical transceivers including the first optical transceiver;
decoding, at the first optical transceiver, the encoded optical signal to produce the control information; and
configuring the first optical transceiver based on the control information.

18. The method of claim 17, wherein:
the control signal is a first control signal,
the control information is first control information,
the optical signal is a first optical signal,
the encoded optical signal is a first encoded optical signal,
the method further includes:
modulating a second optical signal with a second control signal having second control information to produce a second encoded optical signal; and
sending the second encoded optical signal to a third optical transceiver causing the third optical transceiver to configure the third optical transceiver based on the second control information.

* * * * *